United States Patent [19]

Sulzbacher et al.

[11] Patent Number: 4,835,764
[45] Date of Patent: May 30, 1989

[54] TWO-WIRE TIME-DIVISION MULTIPLEX METHOD OF FULL DUPLEX TRANSMISSION BETWEEN A CENTRAL STATION AND A SUBSTATION

[75] Inventors: Norbert Sulzbacher, Weissenohe; Hans-Jürgen Heinlein, Schwaig, both of Fed. Rep. of Germany

[73] Assignee: U. S. Philips Corporation, New York, N.Y.

[21] Appl. No.: 99,930

[22] Filed: Sep. 23, 1987

[30] Foreign Application Priority Data

Sep. 26, 1986 [DE] Fed. Rep. of Germany ....... 3632710

[51] Int. Cl.⁴ .......................... H04B 1/56; H04L 5/14
[52] U.S. Cl. ......................................... 370/29; 370/24
[58] Field of Search ....................... 370/29, 24, 31, 32

[56] References Cited

U.S. PATENT DOCUMENTS

| | | | |
|---|---|---|---|
| 3,974,339 | 8/1976 | Lutz et al. | 370/29 |
| 4,049,908 | 9/1977 | Knorpp et al. | 370/29 |
| 4,476,558 | 10/1984 | Arnon | 370/29 |
| 4,514,840 | 3/1985 | Bader et al. | 370/29 |

Primary Examiner—Benedict V. Safourek
Assistant Examiner—Wellington Chin
Attorney, Agent, or Firm—Leroy Eason

[57] ABSTRACT

With the two-wire time-division multiplex method the directional separation is achieved in that transmission and reception does not take place simultaneously, but alternately on both sides of the transmission path. For bit-by-bit transmission as well as transmission in bursts, the attainable range depends on the signal delay time on the line. To increase the maximum permissible line length when utilizing the two-wire time-division multiplex method, a compensation of the signal delay time in the substation results from the fact that a signal transmission from the substation to the central station is not effected in the second half of the period of the transmission clock pulse, but already as early as in the first half of the bit clock period. The beginning of the signal transmission can be determined, for example, as a function of the measured line length or as a function of pre-set time intervals which are different for the signal transmission in the two directions.

3 Claims, 2 Drawing Sheets

TWO-WIRE TIME-DIVISION MULTIPLEX METHOD OF FULL DUPLEX TRANSMISSION BETWEEN A CENTRAL STATION AND A SUBSTATION

BACKGROUND OF THE INVENTION

The invention relates to a two-wire time-division multiplex method of full duplex transmission between a central or base station and a substation.

The two-wire time-division multiplex method of full duplex transmission of bursts between a base station and a substation is further disclosed in "Digitale Vermittlungstechnik" by H. Besier et al, published by R. Oldenbourg, Munich-Vienna, 1981, pages 180 to 182.

The time-division multiplex transmission is effected by forming time frames, while the structure of the time frames is influenced by the time-division multiplex method implemented for separating the direction. For a reduction of the required modulation rate the blocklength (number of bits) within a time-division data block can be chosen to be largest possible. Usually two PCM words are comprised in a single time frame. As this time frame likewise constitutes a time-division data burst, no frame synchronizing information is required. The directional separation is realized in that transmitting and receiving on both sides of the transmission path does not take place simultaneously but alternately.

From the central station (exchange) an information burst is transmitted periodically. This block, containing the information of a multiplex frame, is received by the substation (terminal station) after the signal propogation delay time. After a protection interval, whose duration is fixed or adapted to the delay time, the substation starts transmitting its information burst of the same duration. This block is received by the base station after the signal propogation delay time. Then a specific waiting time elapses, until the central station again starts transmitting its next information burst. Thus the fixed cycle time results from the sum of twice the duration of the information burst, twice the delay time, the protection interval and the waiting time, while in accordance with the structure of the multiplex frame the cycle time has a value of 125 μs, corresponding to a frame repetition rate of 8 kHz.

On page 182 it is disclosed that the maximum permissible line length with a useful bit rate of 80 kbits/s and a transmission bit rate of 256 kbits/s is approximately 4 kilometers. For extending the range at least two bursts are designed to be combined in one multiplex frame and jointly transmitted, so as to save delay times which necessitate higher intermediate storage costs. In this case the cycle time is 250 μs, corresponding to a frame repetition rate of 4 kHz.

In addition, from the German Patent DE-OS 31 45 126 a data transmission arrangement for full-duplex transmission is known, in which the transmission is effected in a bit-by-bit mode instead of in bursts. Also in bit-by-bit transmission the achievable range depends on the signal delay time on the line. In the two-wire time-division multiplex method known from the above Patent a transmission clock is generated in the central station and a substation clock synchronizable with the transmission clock is generated in the substation. In the first half of the clock period of the transmission clock a signal transmission takes place from the central station to the substation and in the second half a signal transmission takes place from the substation to the central station. The signals are sampled in the substation after a quarter of the clock period of the transmission clock, thus at the instant of the largest eye opening. Furthermore, the clock in the substation tracks the received data flow through a phase locked loop, resulting in a phase shift between transmission clock and substation clock, which corresponds to the signal delay time on the line. The sampling of the data in the central station takes place shortly before the end of the respective bit period of the transmission clock. The proper operation of this two-wire time-division multiplex method known from DE-OS 31 45 126 requires that the signal transmitted from the substation to the central station be received at the central station before the end of the relevant bit period.

The limit value for the achievable range is reached when the signal propogation delay time on the line amounts to a quarter of the bit period.

SUMMARY OF THE INVENTION

It is an object of the invention to modify the time-division multiplex method known from DE-OS 31 45 126 such that in a simple way and manner an increase of the maximum permissible line length is realized.

This object is achieved in accordance with the invention by means of a method as more fully described infra.

The method in accordance with the invention has the advantages, that it is largely independent of the selected line code and that no alteration is required with respect to arrangements in the central station for implementing the method known from DE-OS 31 45 126. Only the substation requires additional circuitry to prevent premature signal transmission from the substation to the central station. The method according to the invention can also be implemented for the transmission of signal bursts. With the method according to the invention the theoretically achievable extension of the range is 50%.

With a two-wire time-division multiplex method, the length of the line and the signal propogation delay time is measured. The extension of the range results from the fact that from the substation to the central station the signal is not transmitted in the second half of the clock period of the transmission clock, but immediately after the signal sampling in the substation. As the signal delay times are short according as the transmission time is short, it is advantageous when the compensation for delay time can be switched off. As the line length and hence the signal delay time is generally known, switching off the delay time cancelling circuit does not require any additional cost.

With a further two-wire time-division multiplex method, there are different time intervals for the signal transmission from the central station to the substation, and from the substation to the central station, respectively. As the transmit and receive time-intervals are chosen to have different lengths in the substation, the line lengths or signal delay time, respectively, need no longer be measured.

BRIEF DESCRIPTION OF THE DRAWINGS

The invention is further described with reference to an embodiment represented in the drawing in which:

FIG. 4a and

DETAILED DESCRIPTION OF THE INVENTION

Figure 1:
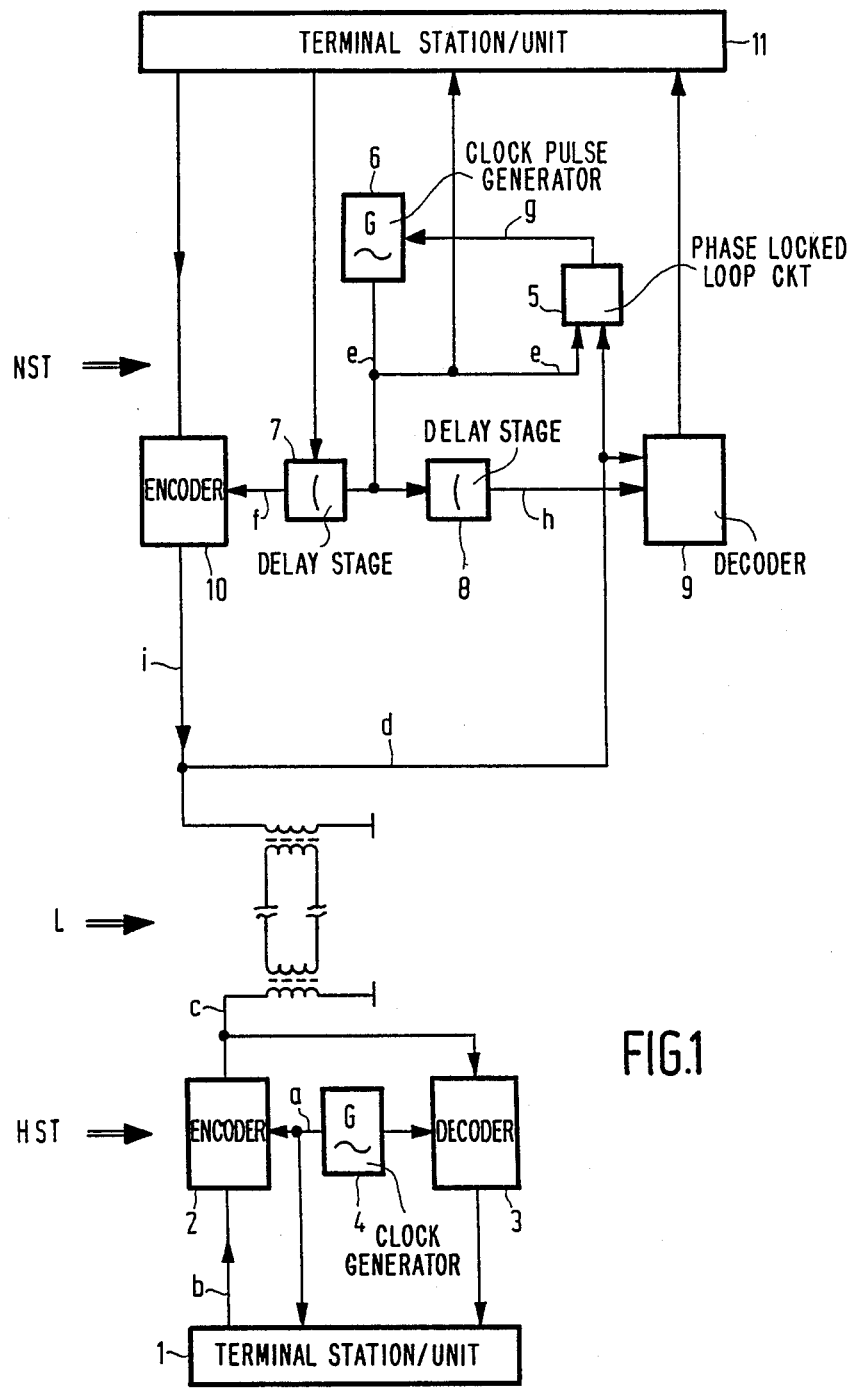
FIG. 1 shows the block-diagram of an embodiment for implementing the method in accordance with the invention.

In FIG. 1 is shown the block-diagram of an embodiment for implementing the method according to the invention. A terminal station 1 is connected to a central station HST and a terminal station 11 is connected to a substation NST. For example, viditel units can be referred to when dealing with terminal stations. The central station HST is connected to the substation NST by a two-wire line L.

In the central station HST a clock generator 4 is arranged which is connected on the one hand to an encoder 2 for applying the transmission clock a and on the other hand to a decoder 3. The encoder 2 takes over from the terminal station 1 the transmission data b and conveys them as encoded transmission signals c to the transmitter connected to the two-wire line L. The transmitter is further connected to the decoder 3, which processes the transmission signal i received from the substation NST and conveys same to the terminal station 1.

In the substation NST an independent, switchable clock generator 6 is arranged which is driven by a PLL circuit 5 according to the two-wire time-division multiplex method described in the DE-OS 31 45 126. The substation clock signal e and the receive signal d are applied to the two inputs of the PLL circuit 5, which produces the phase control signal g for the clock pulse generator 6.

In the substation NST are arranged an encoder 10 and a decoder 9. The encoder 10 converts in the same way as the encoder 2 the transmission data received from the terminal station 11 into the transmission signal i and conveys same to the transmitter connected to the two-wire line L.

The substation clock pulse e is applied on the one hand to a first delay stage 7 and on the other hand to a second delay stage 8. By means of the second delay stage a sampling clock h is produced for the encoder 9, while the time interval is chosen such that the sampling of the signals in the substation NST takes place at the instant when there is the largest eye opening and when the echo signals are suppressed. The sampling of the received signal d preferably takes place after a quarter of the period of the substation clock pulse e.

The substation clock pulse e tracks the transmission clock pulse a of the central station HST through the PLL circuit 5, resulting in a phase shift of the transmission clock pulse a and the substation clock pulse e, which corresponds to the signal delay time on the two-wire line L. The sampling of the received data in the central station HST takes place shortly before the end of the period of the transmission clock pulse a.

Figure 2A:
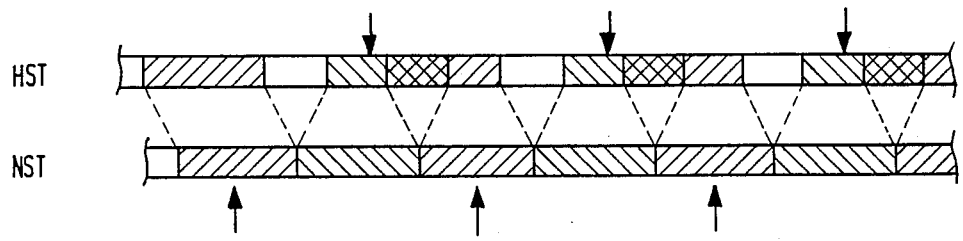
FIG. 2a and FIG. 2b show the variation against time for the known two-wire time-division multiplex method with a short and a long line length.
Figure 2B:
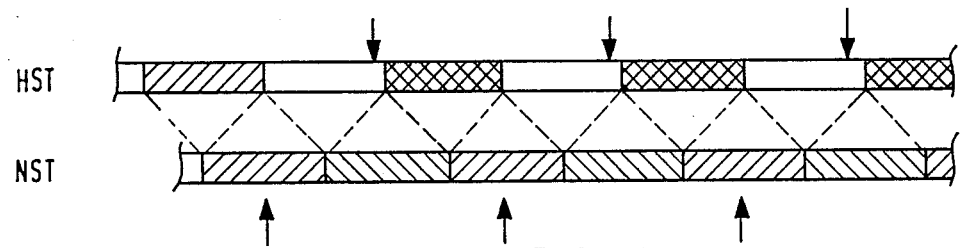

FIGS. 2a and 2b show the variation against time of the two-wire time-division multiplex method known from DE-OS 31 45 126, that is to say without the compensation for delay time according to the invention. The top lines show the time frame in the central station HST and the bottom lines the time frame in the substation NST. Arrows indicate the sampling instant in the central station HST and the substation NST. The width of the the time interval in the central station HST between transmit and receive phase depends on the line length and is equal to twice the value of the signal delay time. As shown in FIG. 2a and FIG. 2b a temporary overlapping of transmit and receive phase occurs in the central station HST (cross-hatched region).

When the line is too long, more specifically, when the signal delay time on the two-wire line L exceeds the time interval of a quarter of the period of a transmission clock pulse, as seen in FIG. 2b, the signal coming from the substation NST is not yet available in the central station HST at the sampling instant therein and will therefore lead to errors.

Figure 3:
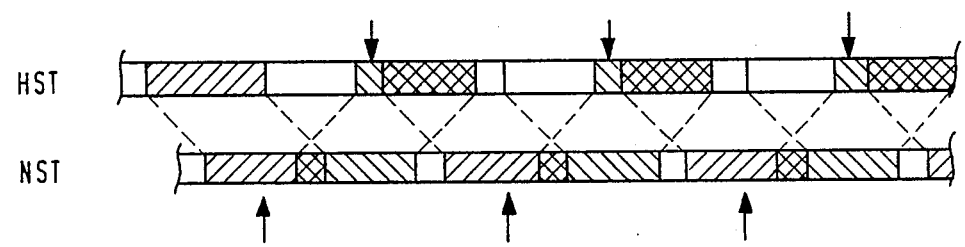
FIG. 3 shows the variation against time for the two-wire time-division multiplex method according to the invention and premature offering of the transmission data in the substation.

FIG. 3 shows the variation against time of the two-wire time-division multiplex method according to the invention for the case in which the transmission data are prematurely offered in the substation NST. The time interval of the delay in the first delay stage 7 can be adjusted as a function of the measured line length (for example by means of a switch or control command through the terminal units 1 and 11). At the sampling instant there are no longer overlaps of the transmit and receive phase both in the central station HST and in the substation NST as a result of the compensation for the delay time. The instant of the premature offering of the transmission data is determined in this embodiment by measuring the line length and the signal delay time, respectively.

Figure 4A:
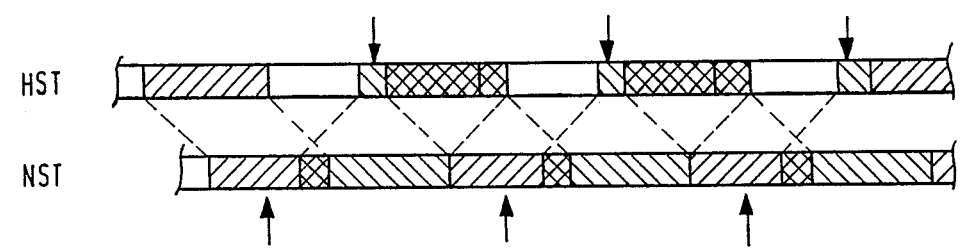
Figure 4B:
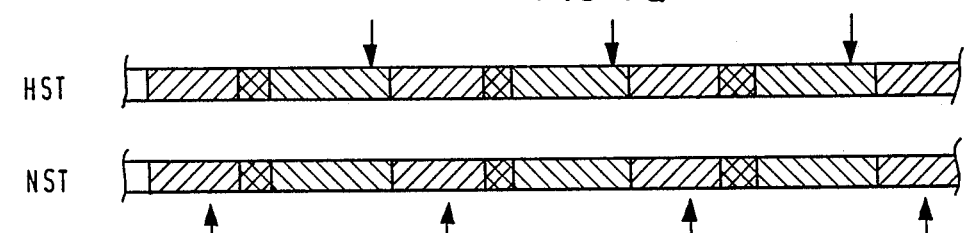
FIG. 4b show the variation against time for the two-wire time-division multiplex method according to the invention and unequal time intervals for transmission and reception.

FIGS. 4a and 4b show the variation against time of the two-wire time-division multiplex method according to the invention when utilizing unequal time slots for transmission and reception. For the case of the long two-wire line L shown in FIG. 4a and the short two-wire line L shown in FIG. 4b, respectively, in the central station HST as well as the substation NST no temporary overlaps of the transmission and receive signals occur at the sampling instant.

We claim:

1. A time-division multiplex method of full duplex transmission over a two-wire transmission path between a central station and a substation, such method comprising the steps of:
   (a) producing periodic transmission clock pulses in the central station which control the instants at which signals received thereby from the substation are sampled;
   (b) producing periodic substation clock pulses in the substation which control the instants at which signals received thereby from the central station are sampled, the substation clock pulses being synchronized with the transmission clock pulses and phase shifted relative thereto to compensate for the signal transmission time over said transmission path;
   (c) effecting signal transmission from the central station to the substation during the first half of the period of said transmission clock pulses, and effecting signal transmission from the substation to the central station principally during the second half of the period of said transmission clock pulses; and
   (d) after each reception by the substation of a signal from the central station, initiating transmission of a signal from the substation to the central station at a time prior to the second half of the period of said transmission clock pulses, such prior time being selected so that the signal transmitted from the substation will be received by the central station prior to the next sampling instant therein.

2. A method as claimed in claim 1, wherein said time prior to the second half of the period of said transmission clock pulses is selected in accordance with the length of said transmission path.

3. A method as claimed in claim 1, wherein signal transmission from the central station to the substation is effected during time intervals of different duration from the time intervals during which signal transmission is effected from the substation to the central station.

* * * * *